United States Patent
Braun

(10) Patent No.: US 7,568,207 B1
(45) Date of Patent: Jul. 28, 2009

(54) CABLE DROP MONITOR WITH UPSTREAM SIGNALLING

(76) Inventor: Warren L. Braun, 680 New York Ave., Harrisonburg, VA (US) 22801

( * ) Notice: Subject to any disclaimer, the term of this patent is extended or adjusted under 35 U.S.C. 154(b) by 602 days.

(21) Appl. No.: 09/599,542

(22) Filed: Jun. 23, 2000

(51) Int. Cl.
H04N 7/16 (2006.01)
(52) U.S. Cl. .................. 725/9; 725/14; 725/15; 725/16; 725/17; 725/105; 725/107; 725/131
(58) Field of Classification Search ......... 725/106–107, 725/118–121, 127–130, 111, 125, 126, 25, 725/131, 15, 105, 143, 148, 149, 14, 16, 725/17, 9; 370/241–248, 305–307, 449, 370/359; 348/180–182; 455/503
See application file for complete search history.

(56) References Cited

U.S. PATENT DOCUMENTS

| | | | |
|---|---|---|---|
| 3,619,783 A * | 11/1971 | Ritter ........................... 725/15 |
| 3,757,035 A * | 9/1973 | Sullivan ....................... 725/107 |
| 3,924,187 A * | 12/1975 | Dormans ...................... 725/125 |
| 4,118,669 A * | 10/1978 | Fung ............................ 725/25 |
| 4,208,630 A * | 6/1980 | Martinez ...................... 375/219 |
| 4,320,497 A * | 3/1982 | Mori et al. ................... 370/248 |
| 4,365,249 A * | 12/1982 | Tabata ......................... 370/252 |
| 4,553,161 A * | 11/1985 | Citta ............................ 725/131 |
| 5,280,629 A * | 1/1994 | Lo Galbo et al. ............ 455/503 |
| 5,351,234 A * | 9/1994 | Beierle et al. ................ 370/307 |
| 5,499,047 A * | 3/1996 | Terry et al. .................. 725/127 |
| 5,563,883 A * | 10/1996 | Cheng ......................... 370/449 |
| 5,592,475 A * | 1/1997 | Gliga et al. .................. 370/359 |
| 5,675,371 A | 10/1997 | Barringer |
| 5,712,897 A * | 1/1998 | Ortel ........................... 379/22 |
| 5,729,824 A * | 3/1998 | O'Neill et al. ............... 725/106 |
| 5,737,363 A | 4/1998 | Dinkins |
| 5,751,766 A | 5/1998 | Kletsky et al. |
| 5,761,606 A | 6/1998 | Wolzien |
| 5,767,895 A * | 6/1998 | Yashiro et al. ............... 725/106 |
| 5,768,280 A | 6/1998 | Way |
| 5,808,671 A | 9/1998 | Maycock et al. |
| 5,812,929 A | 9/1998 | Tsutsui et al. |
| 5,874,992 A | 2/1999 | Caporizzo |
| 5,883,664 A | 3/1999 | So |
| 6,069,947 A * | 5/2000 | Evans et al. ................. 379/229 |
| 6,260,193 B1 * | 7/2001 | Chang et al. ................ 725/121 |
| 6,480,748 B1 * | 11/2002 | Gerszberg et al. ........... 700/21 |
| 6,598,232 B1 * | 7/2003 | McAlear ..................... 725/126 |

* cited by examiner

Primary Examiner—John W Miller
Assistant Examiner—Sumiya A Chowdhury
(74) Attorney, Agent, or Firm—Whitham, Curtis, Christofferson & Cook, P.C.

(57) ABSTRACT

A time slot is provided for each terminal unit or cable drop of a signal distribution system in a repeated sequence to communicate detected conditions "upstream". The time slots are defined in accordance with a time base responsive to broadcast time signals. An identification of each terminal unit is transmitted from a directional coupler corresponding to the terminal unit or cable drop after latching an output of a condition detector responsive to detection of a condition by a sequence of tones or tone pairs, preferably using circuits ubiquitous in the telecommunications industry. A printer is provided for each channel at a central facility and the transmitting terminal unit is identified in response to another time base operating synchronously with the time base defining the time slots and assigning the time slots to respective terminal units. Provision is made for synchronization of counters, error checking and control of polling frequency.

23 Claims, 3 Drawing Sheets

CABLE DROP MONITOR WITH UPSTREAM SIGNALLING

BACKGROUND OF THE INVENTION

1. Field of the Invention

The present invention generally relates to signal distribution systems such as cable access television (CATV) systems and, more particularly, to cable customer drop condition monitoring and upstream communications for condition reporting.

2. Description of the Prior Art

Cable access television (CATV) is in widespread use and large systems for distributing large numbers of channels of programming from a central facility to large numbers of subscribers have been installed in at least most metropolitan areas of the United States. At present, there is substantial interest in using the cable facilities for additional purposes that may involve transmission from subscribers to the central facility such as Internet access, home shopping, interactive programming and the like in view of the large band width available thereon. Numerous arrangements have been proposed to provide or adapt CATV systems to permit bi-directional signalling over the cable facilities. Communications from subscribers to a central facility or subdivisions thereof has become generally referred to as "upstream" communications.

Such proposals have generally been characterized by complexity and large expense of the subscriber hardware which may or may not be justified by the subscriber's needs. Certainly, the subscriber hardware necessary for upstream communications is beyond that which is economically feasible to include as a standard feature of subscriber installations at the present time since CATV systems may service several hundred thousand subscribers, and particularly because only a small fraction of subscribers may wish to have upstream communication capability in an original installation. The provision for upstream communications in a device additional to the standard set-top box (STB) is also inconvenient and unsightly and significant customer resistance to such an arrangement is anticipated.

At a much more basic level, however, CATV systems have substantially become utilities for service to a large fraction of the public. Accordingly, it is desirable to monitor the condition of subscriber hardware, sometimes referred to as a cable drop or terminal unit. If the cable drop cannot be kept in service, a refund of a portion of subscriber fees may be required to reflect the loss of service to the subscriber. In such a case, it is important for the CATV system operator to be able to document substantially exact periods during which service was not provided.

Such information, including frequency of loss of functionality is also important to scheduling of maintenance and, perhaps more importantly, to relationships with subscribers. Of course, reliability of any monitoring system is of paramount importance and large operating margins are very desirable but have generally implied a trade-off with the signal distribution system capacity to provide other upstream communications that may be desired as well as acceptably high frequency of polling of each individual cable drop. By the same token, provision for maintaining the monitoring system itself is desirable and the reduction or interruption of monitoring capacity during such maintenance may compromise the monitoring function.

While the amount of information derived from condition monitoring of cable drops may be relatively less than might be required for other types of upstream communications over the CATV system, more or less continuous monitoring of cable drop condition implies a need for substantially continuous and simultaneous upstream communications from all (e.g. up to one hundred thousand) subscribers over a communication link. Functionally simultaneous communications from such a potentially large number of subscribers presents difficulty in identifying specific communications from individual subscribers or cable drops.

For example, frequency multiplexing requires wide bandwidth since the frequencies used must be well-separated and cannot be harmonically related. Time multiplexing requires a large number of time slots which must each be substantially larger than transmission delay over the system to avoid ambiguity. Coded communications requires decoders of substantial complexity and an increased amount of data (to identify the subscriber), both communicated and stored, as well as some synchronization of transmissions. All of these and other techniques proposed to date also present difficulties in integration with or retrofitting to existing systems.

Further, any upstream communication facility requires transmission circuits to be effectively provided in each cable drop and the expense cannot generally be passed along to the subscriber. Moreover, such monitoring must not interfere with the capacity of the CATV system to provide other services that involve upstream communications that particular subscribers may desire and which are likely to be in much greater demand in the near future. At the current state of the art, there has been no proposal which can simultaneously satisfy these communications requirements for even rudimentary monitoring of cable drop condition, particularly in regard to the prohibitive cost of providing such facilities individually for large numbers of cable drops.

If such monitoring could be provided, however, valuable services could be rendered to the customers and to the public at large. For example, subscriber sets for CATV systems obtain power from electrical utilities and power outage could be resolved to individual residences through the CATV system. (The CATV provider also has an interest in maintaining service to its subscribers and, further, the CATV system may be a source of emergency information to the public which must be maintained in the interest of the public safety.) Additionally, knowledge of the availability of power to CATV systems is a necessary incident of remote diagnostics of the cable drop condition, regardless of what other operational conditions may or may not be monitored. While the above problems are particularly evident in regard to CATV systems at the present time, it is evident that the nature of other signal distribution or communication systems may present similar difficulties in remote monitoring of the condition of individual subscriber equipment.

SUMMARY OF THE INVENTION

It is therefore an object of the present invention to provide a system for monitoring signal distribution systems at the level of individual subscriber facilities and to provide upstream communication of information indicating monitored operating conditions.

It is another object of the present invention to provide an upstream communication system for limited information from all subscribers of a signal distribution system at very small additional cost per subscriber.

It is a further object of the invention to provide for upstream communication of data in a signal distribution system sufficient for monitoring operating condition of individual subscriber drops without significantly reducing the capacity of the signal distribution system to carry other upstream communications and with flexible and potentially large operating margins.

It is yet another object of the invention to provide a system for limited upstream communications which can be implemented in a phased fashion and which does not compromise monitoring capacity during maintenance periods.

It is another further object of the invention to provide for continuous cable drop monitoring independent of power availability which does not interfere with any other upstream or downstream communications over a signal distribution cable system.

It is another further object of the invention to provide a cable drop monitoring system which can be implemented inexpensively with existing hardware and integrated circuits.

In order to accomplish these and other objects of the invention, a signal distribution system is provided including a communication path between a central facility including a signal source to a plurality of cable drops, a condition detector at each of the plurality of cable drops, an arrangement preferably in the nature of a telephone dialer for providing a sequence of tones responsive to the condition detector, an arrangement for coupling the sequence of tones to the communication path during a time slot determined by a time base, and means for decoding the sequence of tones at the central facility.

In accordance with another aspect of the invention, a method of monitoring a plurality of terminal units of a system is provided including the steps of assigning a time slot of a plurality of sequential time slots to each terminal unit of a group of terminal units, selectively coupling a signal including a sequence of tones to a communication link of the system in a time slot corresponding to a terminal unit based on a detected condition, and identifying a terminal unit in accordance with the sequence of tones at a central facility and synchronized with the time slots.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
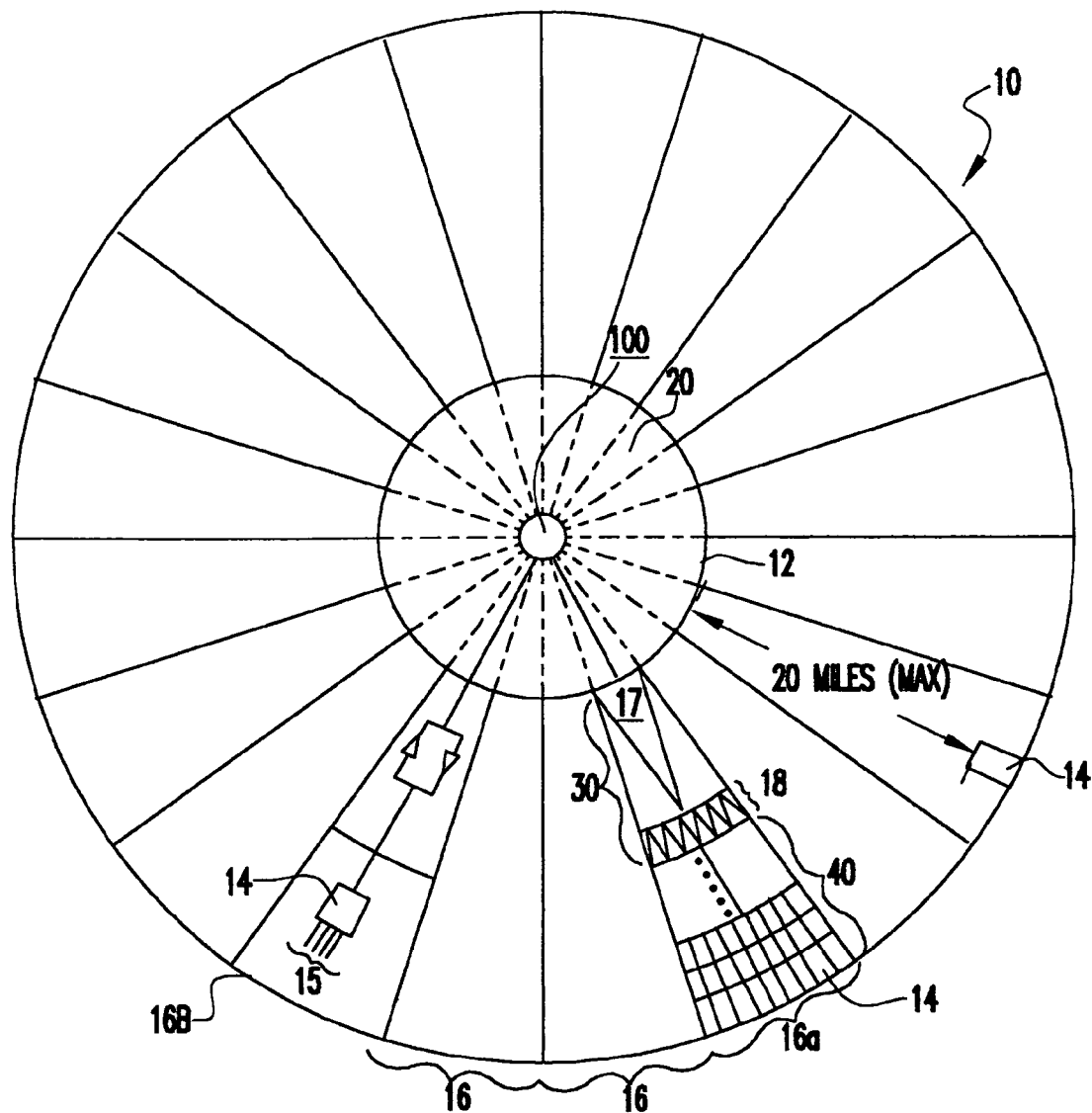
FIG. 1 is a schematic depiction of a cable access television system including the invention.

Referring now to the drawings, and more particularly to FIG. 1, there is shown a schematic depiction of a cable access television (CATV) signal distribution system 10 in accordance with the invention. It should be understood, as will be described in greater detail below, that FIG. 1 also depicts the typical extent of existing CATV systems forming the preferred environment of the invention. However, since FIG. 1 also illustrates the cooperation of the invention with this preferred environment, no portion of FIG. 1 is admitted to be prior art in regard to the invention. It should also be understood that the CATV system in FIG. 1 is represented at a high level of abstraction in order to emphasize the general organization of the CATV system in regard to a current maximum limit of one hundred twenty thousand subscribers. If service to a greater number of subscribers must be provided, the arrangement of FIG. 1 may be replicated any number of times.

The CATV system 10 is depicted in FIG. 1 in circular form since the maximum signal path is generally limited to about twenty miles between a central station 12 and the subscriber 14 most distant therefrom in order to limit signal propagation time to less than two hundred microseconds. The CATV system is also divided into twenty sectors or subsections 16 to limit the requirements for powering, signal regeneration and the like by substantially equalizing the subscriber load between subsections.

The conventional (downstream) transmission path of each sector is schematically shown in sector or subsection 16a and it should be understood that similar structure is provided in each subsection 16. Details of the downstream link are not critical and may differ somewhat between sectors and between CATV systems. The upstream link in accordance with the invention will be discussed below in regard to the symbolic illustration thereof in sector 16b and is similarly provided in each sector 16 and superimposed on the downstream link 16a as shown in more detail in FIG. 2. As with the downstream link, the details of implementation of the upstream link are not critical to the practice of the invention and may vary somewhat between sectors and CATV systems while conforming to the basic principles of the invention.

Since the CATV system 10, by convention, can have a maximum of one hundred twenty thousand subscribers, one sector or subsection 16 is limited, again by convention, to six thousand subscribers, collectively indicated at 40. The central station 12 will, of course, include a source of programming 100 which provides an input to subsection transmitters 17 and is applied to various branch lines of the subsection and which may contain repeaters, amplifiers and other circuits to maintain signal quality, collectively indicated at 30. The branch lines will also include powering points, collectively indicated at 18 which contain circuits for deriving power from the transmitted signal for active circuits in the branch lines which provide the signal to each directional coupler 14 (generally a four-way directional coupler) in section 16a and thence to the individual cable drops connected thereto.

Thus, in summary, each subsection or sector may have a maximum of six thousand subscribers or cable drops and operates independently of and in parallel with all other sectors of CATV system 10 which together can provide a maximum of one hundred thousand cable drops. Since the subsections operate independently, however, the subdivisions 16 of system 10 must be observed in any upstream signalling arrangement. However, six thousand functionally simultaneous upstream transmissions is far too large to accommodate with frequency or time division multiplex or coded communications arrangements while meeting other criteria for a cable drop monitoring system; a significant requirement being the capability of accommodating other upstream communications which could be provided for the use of subscribers. Accordingly, the communication burden on the system due to the monitoring system must be minimized while providing operating margins that will yield a robust and reliable system.

These qualities are developed through the provision of two key features of the invention in accordance with its basic principles thereof as will now be described with reference to sector 16b of FIG. 1 as detailed in FIG. 2. First, a universal time base 110 is provided at each directional coupler 14' and at the central facility which will be used in several ways that will be described below. Second, a relatively low frequency carrier signal can be easily and economically derived from a low cost crystal oscillator and a divider chain which will not interfere with other upstream or downstream communications. The invention thus preferably employs a 25 KHz carrier which can be derived from a crystal oscillator (such as is readily commercially available and a divide-by-100 circuit which is also commercially available at low cost).

It is considered important to the robustness, flexibility and economy of the invention that frequency multiplexing is not relied upon at any point in the upstream communications link. The upstream link provides a time slot for each cable drop and implemented from the directional coupler 14 with a frequency-based code to identify the individual cable drops in a simple manner which will now be explained. The time slot duration is not particularly critical to the practice of the invention but a one-second time slot per cable drop is considered to provide convenience, good operating margins in the context of existing and commercially available circuits and substantial flexibility of implementation with acceptably frequent polling of the cable drops.

Specifically, it is preferred to use a frequency-based coding system similar or identical to that used for "touch-tone" telephone dialing. This arrangement utilizes only seven frequencies in pairs to cover ten or twelve discrete characters (e.g. numerals 0 to e 9, * and #). These frequency pairs are easily generated with a keyboard which can be emulated with a cross-bar switch that can be field programmed. Memories such as EEPROMS or other arrangements such as automatic dialers now readily available in many telephone sets can also be used to generate tone pairs or sequences thereof. Automatic dialers generally are arranged or can be controlled to transmit five to ten or more tone pairs per second. A sequence of tone pairs may be easily and reliably decoded by a commercially available fast Fourier transform integrated circuit which is also ubiquitous in telecommunications and other technologies which utilize data transmitted as tones from telephone keypads.

Five tone pairs is adequate to uniquely identify each of one hundred thousand subscribers and additional digits which can be transmitted in a one-second time slot can be used for additional subscribers (e.g. six tone pairs for one hundred twenty thousand subscribers), set-up (e.g. a particular number or number group used to identify a transmission over the system and/or cover the 200 microsecond period of maximum system transmission delay), redundancy, channel selection at the central facility, error checking or recovery or additional information, as may be desired. However, at the present state of the telecommunications art, ten tone pairs transmitted in one second can be reliably decoded with good operating margins.

It should be appreciated that while the invention is described in terms of the preferred implementation utilizing commercially available hardware and circuitry, any tone-coded arrangement is suitable for the practice of the invention. It is only necessary to provide and discriminate a number (e.g. ten) of tones in a short sequence to provide a unique coded identification for each subscriber. This can be easily accomplished at low bandwidth (compatible with a low frequency carrier signal alluded to above) by many different circuit designs which will be apparent to those skilled in the art.

Time slots are defined independently but synchronously at the central station 22 and at the directional couplers by a universal time base at each location. These universal time bases are readily available commercially at low cost and are synchronized by radio transmissions from the National Bureau of Standards which is received over a small antenna. A suitable time base unit (which is preferably battery powered) is marketed under the name of "The Time Machine" by Oregon Scientific, 19861 S. W. 55th Place, Tualatin, Oreg. Individual time slots may be identified by simply counting the one-second intervals derived from this unit. It should be appreciated that such counting to identify a time slot corresponding to a particular cable drop need only be performed at the directional coupler or, less desirably, the cable drop.

Thus, in summary, when a monitored condition is detected at a cable drop, a signal is sent from the cable drop to the directional coupler to which it is connected. The time base and counter at the directional coupler 14' identifies a time slot associated with the cable drop and, if a signal has been received therefrom when the time slot of the cable drop is reached, a tone or tone pair sequence generated, for example, in the same manner as an automatic dialer is sent from the directional coupler upstream to the central facility 22. The tone or tone pair sequence received by the central facility is decoded (e.g. in the manner of telephone keypad data) and recorded with a simple and inexpensive printer for appropriate action to be taken.

It should be appreciated that, in the preferred implementation, only well-known and commercially available, low cost circuits are required. Essentially all circuits other than the crystal oscillator and counter and the time base and counter are a subset of the circuits available in telephone sets. Further, the number of transmitters is reduced by performing the upstream signalling from the directional couplers rather than the cable drops, which also avoids a need to provide bidirectional signalling at the directional couplers, as well. Operating margins have been proven adequate though experience in the telecommunications industry. Therefore, the cost per cable drop is very low (e.g. the cost for hardware adequate to monitor four cable drops would be significantly less than the retail price of a single telephone set having a redial feature). Other standard telephone hardware and circuitry is adequate for installation and field programming of the transmitters.

It should also be appreciated that the system in accordance with the invention is extremely flexible in regard to cable drop polling frequency consistent with very large operating margins. For example, using a one-second time slot, each of one hundred twenty thousand cable drops could be individually monitored in about one hour and forty minutes using only a single "channel" at the central facility per sector, assuming twenty sectors operating concurrently. Ninety thousand cable drops (approximating a generally average number of actual subscribers to the CATV system of FIG. 1) could be individually monitored in one hour (and using one fewer tone pair for cable drop identification; yielding a 20% increase in discrimination time per tone pair).

If a decrease in polling frequency is tolerable, fewer channels can be provided in the central facility (e.g. one channel for each pair of CATV system sectors) with no decrease in operating margins since six tone pairs are capable of uniquely identifying one million cable drops. While central facility hardware is simple and inexpensive (essentially a decoder and a printer for each channel) this flexibility can easily accommodate periods for routine maintenance and repair or substitution of hardware elements.

Conversely, provision of more than one channel per sector can increase operating margins and multiply polling frequency for little additional expenditure in hardware. By the same token, the system in accordance with the invention can be implemented by degrees, particularly as the number of subscribers increases, while maintaining reasonably and acceptably high polling frequency and operating margins. Time base counter cycles may be readily modified by downstream signalling, for example, by latching one or more most significant bits of the counter or comparator to increase the polling frequency by integral powers of two.

Having described the basic principles and operation of the invention, a preferred implementation will now be described with reference to FIGS. 2-4. Referring first to FIG. 2, the entire communication path including a CATV system with the upstream communication link in accordance with the invention and superimposed thereon is schematically shown. For ease of identification of parts of the standard CATV system, decoupling capacitors 31 are shown to indicate the high frequency, broadband communication path even though such capacitors may or may not be employed. The relatively low frequency carrier preferred for implementation of the invention can generally be transmitted upstream through powering points 30 or otherwise since such capacitors, if and where employed, are generally of small value and intended principally to block voltage which is used to power various elements of the system and transmitted over the signal cable at 30 or 60 volts (supplied by local transformer 32, resistor 33 and diode 34) which can be separated to power repeaters 38 and the like.

More specifically, the CATV system which forms the preferred environment for the invention includes a CATV transmitter section 20, one or more intermediate line distribution sections 30 having repeaters/amplifiers 38 with powering points schematically depicted as transformer 32, resistor 33 and diode 34 (power may also be derived from power supplies powered from an electric utility), a termination section 40 having a directional coupler 41 and individual cable drops and decoders/set top boxes (STBs) 42a-42d, collectively indicated at 15. The CATV system may also include a more or less broadband upstream link represented by upstream receiver 22. The upstream link is optional and unimportant to the understanding or practice of the invention other than that the upstream link of the invention does not interfere with it.

In accordance with the invention, the central facility 20 includes a time base 23, described above, a tone decoder 28 (e.g. tone pair to ASCII) and a printer/recorder or other annunciator such as a display 29. However, it is considered preferable but not necessary to include a time slot counter 24, a polling frequency control 25, a synchronization reset transmitter 26 and an error checking device 27. If employed, counter 24 will develop a number for each time slot which can be compared to data transmitted from the directional couplers to detect the expected correspondence. This feature may be useful, for example, to avoid tampering. Polling frequency control 25 may be used to assure correspondence between operation of time slot counter 24 at the central station, if used, and/or the counting sequence at remote time slot counters 24' (e.g. by latching digits as alluded to above).

These perfecting feature of the invention are preferably supported by a reset synchronization transmitter 26 which emits, for example, a pulse or tone burst to reset the remote time slot counters 24' of all directional couplers so that the counts of all counters 24, 24' will be the same. It will be recalled from the foregoing that the time bases 23, 23' will be synchronized by detection of a common radio signal or the like but may or may not have the facility for providing a particular time indication at reasonably short intervals to which the counters may be synchronized. The synchronization reset transmitter provides a convenient and inexpensive facility for synchronizing the counters, if desired, and may use any desired count of counter 24 to do so, such as being responsive to a transition of the most significant bit (MSB) of the counter output.

Use of such a transition (e.g. rollover or carry) of the MSB is also convenient for changing the polling frequency at controller 25. For example, the polling frequency transmitter could be used to simply select the counter bit which will be treated as most significant and reset all counters accordingly while transmitting a pulse or tone burst downstream to alter comparator function correspondingly at the directional couplers 14' or, more generally, 40.

Figure 2:
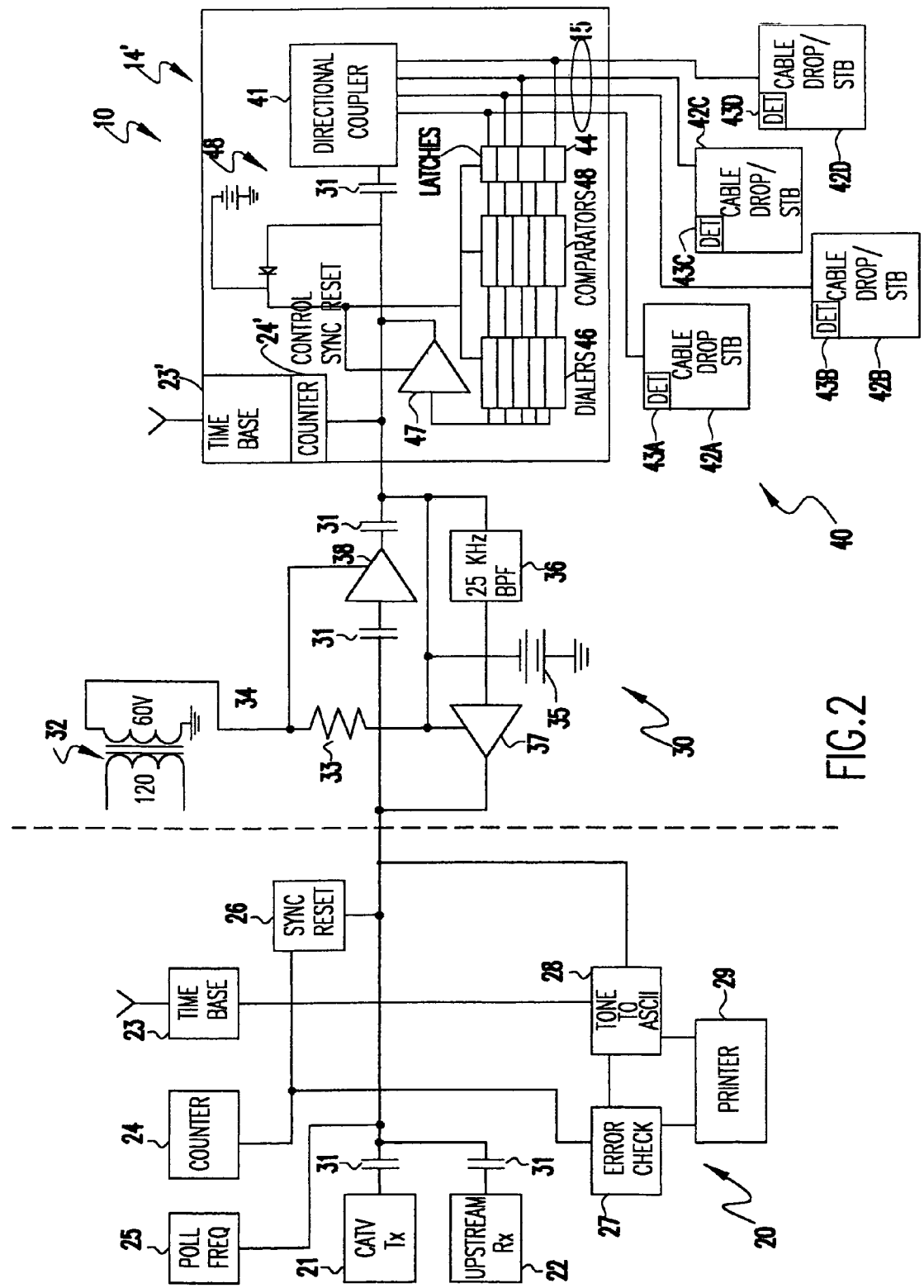
FIG. 2 is a schematic depiction of a communication link from a subscriber drop to a central facility in accordance with the invention.

The distribution section 30 of FIG. 2 includes repeaters or amplifiers and power points to provide power for them. These elements compensate for losses in the length of cable over which signals are distributed and are usually placed at more or less regular intervals in the distribution system. As indicated above, these elements will generally pass relatively low frequency signals such as the 25 KHz carrier signal preferred for practice of the invention and cable losses will generally be low at such frequencies. Nevertheless, it may be desirable to include upstream repeaters 37, preferably including bandpass filters 36, to enhance the upstream signalling in accordance with the invention.

In this regard, it is considered to be a further perfecting feature of the invention to also include a battery 35, preferably of the lithium type, and a trickle charging arrangement such as diode 34 and resistor 33. If a repeater 37 and/or filter 36 is employed, they are preferably powered from the battery in the event of failure of the power distributed over the cable system. Power may also be provided downstream from battery 35 to supplement other batteries and charging arrangements 48 in the directional couplers and increasing robustness of the system.

At the location 40 of the cable drops 15, the directional coupler 14' in accordance with the invention also includes a time base 23' and counter 24' as described above to allow the time slots corresponding to the respective ones of cable drops 15 to be identified. Generally four cable drops are provided from the conventional portion 41 of each such directional coupler and connected to STBs 42a-42d.

Figure 3:
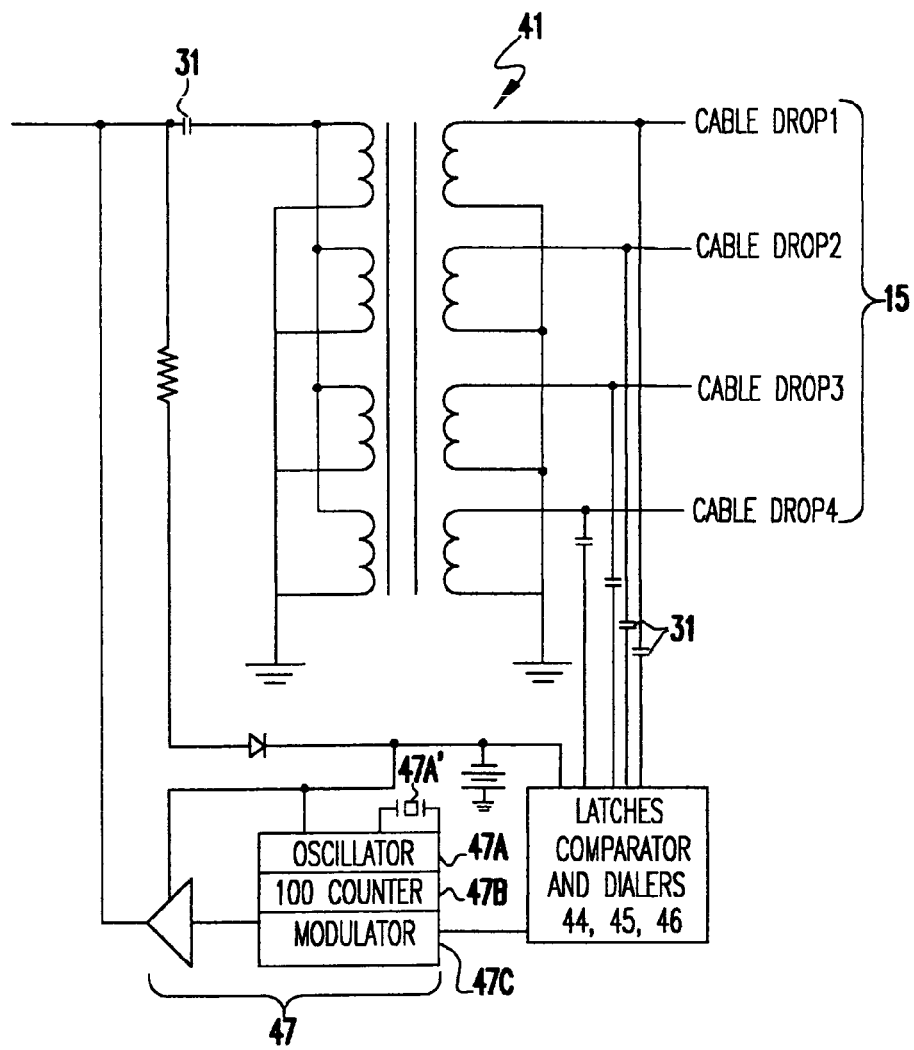
FIG. 3 is a schematic depiction of n four-way directional coupler including an upstream communication facility and power arrangement in accordance with the invention.
Figure 4:
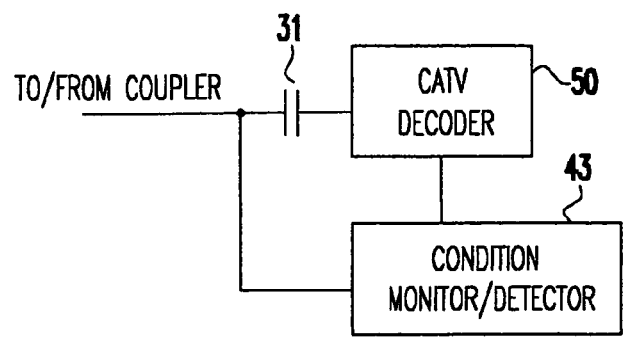
FIG. 4 is a schematic depiction of a cable drop in accordance with the invention.

This portion 41 of the directional coupler is shown in greater detail in FIG. 3. In accordance with the invention, each cable drop/STB 42a-42d includes a CATV decoder 50 and a condition monitor or detector 43, 43a-43d, more particularly shown in FIG. 4. A transmitter for a broadband upstream link may also be included in the STB but is not illustrated since its presence or absence is irrelevant to the invention. The details of the condition detector are also unimportant to the invention and any arrangement suitable for detecting the condition of interest, such as loss of power or signal loss or noise ingress may be employed. Any type of signalling back to the directional coupler 14' may be employed for one or more condition detectors.

It should be understood that it is preferred that no signal be transmitted over the system 10 during the time slot for any particular cable drop if the monitored condition or conditions are nominally correct since there is generally no need for a report of nominal operation. However, such a signal confirming nominal operation could be transmitted, if desired. Accordingly, it is preferred that no signal be provided from detector 43 in the absence of a condition indicating a malfunction.

When a signal is emitted at any time, however, it is detected and latched at 44 to await a time slot for transmission. A unique address or identification number for each cable drop is stored in comparators 45 while time slot numbers are generated by counter 24'. The addresses and identification numbers may be field programmed at installation in a manner identical, in the preferred implementation of the invention, to the setting of a speed dialer or a redial mechanism of an ordinary telephone having either facility. When a correct comparison is made, the comparator provides an output to a circuit such as a speed dialing or redialing circuit 46 which outputs a sequence of tones or tone pairs. (If more than a single condition is to be reported, one or more additional tones or tone pairs may be output to indicate a any of a plurality of conditions of a combination thereof. To do so, the latches, comparators and dialers can be replicated for each cable drop or combinations of latches for each cable drop could be encoded or the like.)

The sequence of tones or tone pairs are then used to modulate a carrier frequency at modulator 47. As shown in greater detail in FIG. 3, modulator 47 is preferably comprised of a crystal oscillator 47*a* controlled by crystal 47*d*, a divide-by-one hundred counter 47*b* and a modulating amplifier 47*c*. The resulting signal is transmitted upstream to the central station, possibly through one or more filters 36 and repeaters 37. At the central station, the signal is demodulated in any known fashion and decoded by a tone to digital code (e.g. ASCII) decoder 28 which can then be applied directly to a printer. Again, such decoders are known from the telecommunications industry and are commercially available at low cost.

Such decoding can be provided in many other ways, as well, which will be evident to those skilled in the art and could even be done in software on a personal computer. However, decoding for direct printing is preferred as being of least cost and, if the invention is implemented in multiple sections in accordance with CATV system sectors 16, of greatest convenience since the sectors will be geographically defined and printed reports will be geographically correlated to the sectors and thus convenient for field repair personnel. In this regard, when the invention is implemented in plural sections or channels, time slots are simultaneously provided to cable drops in different sections and may have similar or identical addresses or identifications. However, reporting of signalling remains unique within a section or sector. Therefore, no ambiguity is engendered between sections or addresses.

In view of the foregoing, it is seen that the condition monitoring system in accordance with the invention provides a flexible and operationally robust arrangement capable of monitoring a very large number of locations with flexible polling frequency that can be made arbitrarily high. The system can be implemented at very low cost by use of existing hardware and circuits and operating margins have been demonstrated to be adequate for extremely high reliability in the telecommunications industry. The system cannot interfere with other downstream or upstream broadband communications and requires only extremely limited bandwidth. The system, in its preferred form can operate for a substantial period of time from battery power independent of power outages and interruptions and is resistant to tampering and spurious signals as well.

While the invention has been described in terms of a single preferred embodiment and implementation, those skilled in the art will recognize that the invention can be practiced with modification within the spirit and scope of the appended claims.

Having thus described my invention, what I claim as new and desire to secure by Letters Patent is as follows:

1. A signal distribution system including
    a communication path between a central facility including a signal source and a termination section including a plurality of cable drops,
    a condition detector at respective ones of said plurality of cable drops,
    means for providing a sequence of tones responsive to said condition detector,
    means for coupling said sequence of tones to said communication path during a time slot associated with a said cable drop determined by a time base at said termination section of said communication path, and
    means for decoding said sequence of tones at said central facility in accordance with respective time slots as determined by a time base at said central facility, said respective time slots as determined by said time base at said central facility including a time slot corresponding to said time slot as determined by said time base at said termination section of said communication path, said time base at said termination section and said time base at said central facility being independent of each other and responsive to a broadcast time signal, said broadcast time signal including a time indication signal for synchronization of corresponding time slots, wherein said termination section does not require any need for any interrogation downstream signaling or to independently broadcast a broadcast time signal from the central facility and vice-versa.

2. A system as recited in claim 1, wherein said means for providing said sequence of tones provides a sequence of tone pairs.

3. A system as recited in claim 2, wherein said means for decoding provides a digital signal input to a printer.

4. A system as recited in claim 1, wherein said condition detector detects at least one of power outage and ingress.

5. A system as recited in claim 1, wherein said system is divided into a plurality of sectors.

6. A system as recited in claim 1, wherein said time base is provided at a directional coupler providing communication links to a plurality of said cable drops.

7. A system as recited in claim 1, wherein said time base includes a counter for counting time slots.

8. A system as recited in claim 7, further including a comparator responsive to said counter for identifying time slots corresponding to respective ones of said plurality of cable drops.

9. A system as recited in claim 8, further including
    means for latching an output of said condition detector and wherein said comparator is responsive to an output of said means for latching and said counter for controlling said means for generating said sequence of tones.

10. A system as recited in claim 1, further including
    a time base at said central facility, and
    means for counting time slots at said central facility.

11. A system as recited in claim 10, further including
    means for comparing an output of said means for counting time slots at said central facility and an output of said means for decoding said sequence of tones.

12. A system as recited in claim 1, further including
    means for controlling polling frequency of said cable drops.

13. A system as recited in claim 7, further including
    means for resetting said counter.

14. A system as recited in claim 10, further including means for synchronizing said counter with said means for counting time slots at said central facility.

15. A system as recited in claim 1, further including
    means for storing power for operation of said condition detector, said means for providing said sequence of tones and said means for coupling said sequence of tones to said communication link.

16. A system as recited in claim 1, wherein said means for coupling said sequence of tones to said communication link includes means for modulating a carrier signal.

17. A system as recited in claim 16, wherein a frequency of said carrier signal is approximately 25 KHz.

18. A method of monitoring a plurality of terminal units of a system including the steps of assigning a time slot of a plurality of sequential time slots to each terminal unit of a group of terminal units, said time slots being independently but synchronously defined at a termination section and a central station of said system responsive to a broadcast time signal including a time indication signal for synchronization of corresponding time slots at said termination section and said central facility, respectively, wherein said termination section does not require any need for any interrogation downstream signaling or to independently broadcast a broadcast time signal from the central facility and vice-versa, selectively coupling a signal including a sequence of tones to a communication link of said system in a time slot corresponding to a terminal unit based on a detected condition, and identifying a terminal unit in accordance with said sequence of tones at a central facility and synchronized with said time slots.

19. A method as recited in claim 18, including the further step of printing indicia corresponding to said sequence of tones.

20. A method as recited in claim 18, including the further step of transmitting a further tone corresponding to said detected condition.

21. A method as recited in claim 20, including the further step of printing indicia corresponding to said further tone.

22. A method as recited in claim 18, including the further step of storing power for performing said assigning and selectively coupling steps with electrical circuits.

23. A method as recited in claim 18, wherein said sequence of tones include a sequence of tone pairs.

\* \* \* \* \*